(12) United States Patent
Sjödin et al.

(10) Patent No.: US 11,808,916 B2
(45) Date of Patent: Nov. 7, 2023

(54) PRECIPITATION MONITORING USING POINT TO POINT RADIO LINKS

(71) Applicant: Telefonaktiebolaget LM Ericsson (publ), Stockholm (SE)

(72) Inventors: Martin Sjödin, Gothenburg (SE); Jonas Hansryd, Gothenburg (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/264,983

(22) PCT Filed: Aug. 31, 2018

(86) PCT No.: PCT/EP2018/073477
§ 371 (c)(1),
(2) Date: Feb. 1, 2021

(87) PCT Pub. No.: WO2020/043308
PCT Pub. Date: Mar. 5, 2020

(65) Prior Publication Data
US 2021/0325567 A1  Oct. 21, 2021

(51) Int. Cl.
*G01W 1/14* (2006.01)
*H04B 17/318* (2015.01)
*H04W 28/02* (2009.01)

(52) U.S. Cl.
CPC ............ *G01W 1/14* (2013.01); *H04B 17/318* (2015.01); *H04W 28/0236* (2013.01)

(58) Field of Classification Search
CPC .......... H04W 28/0236; H04W 52/0206; G01S 13/951; G01W 1/14; H04B 17/318;
(Continued)

(56) References Cited

U.S. PATENT DOCUMENTS

| 4,761,828 A | 8/1988 | Rinderle |
| 5,861,855 A | 1/1999 | Arsenault et al. |

(Continued)

FOREIGN PATENT DOCUMENTS

| CA | 2831222 A1 | 4/2014 |
| CN | 101951680 A | 1/2011 |

(Continued)

OTHER PUBLICATIONS

Olausson, T. et al., "Disturbance Detection and Classification in Large Microwave Networks", Chalmers University of Technology Master's Thesis, Jan. 1, 2017, pp. 1-48, Chalmers University of Technology.

(Continued)

*Primary Examiner* — Harshad R Patel
*Assistant Examiner* — Truong D Phan
(74) *Attorney, Agent, or Firm* — COATS & BENNETT, PLLC (57) ABSTRACT

The present disclosure relates to a weather precipitation monitoring system (300, 400, 500) that comprises a weather monitoring unit (330), a classification unit (320, 420, 520) and at least one point to point radio link (310A, 310B, 310C). The classification unit (320, 420, 520) is arranged to obtain link data (X1, X2, XN) from the at least one point to point radio link, where the link data comprises received signal strength data associated with an operation of the at least one point to point radio link (310A, 310B, 310C). The classification unit (320, 420, 520) is arranged to determine disturbance event data (Y1, Y2, YN) based on the link data indicating if the received signal strength data is affected by at least one point to point radio link than a precipitation event. The weather monitoring unit (330) is arranged to monitor precipitation in the geographical region (630) based on the link data (X1, X2, XN) obtained from the at least one (Continued)

point to point radio link (310A, 310B, 310C) and on the disturbance event data (Y1, Y2, Y3) obtained from the classification unit (320, 420, 520).

19 Claims, 6 Drawing Sheets

(58) Field of Classification Search
CPC ......... H04B 1/38; H04B 17/12; H04B 17/21; Y02A 90/10; H04L 1/0003; H01Q 1/005
See application file for complete search history.

(56) References Cited

U.S. PATENT DOCUMENTS

| | | |
|---|---|---|
| 6,490,314 B1 | 12/2002 | Khayrallah et al. |
| 8,984,939 B1 | 3/2015 | Eilts et al. |
| 9,119,178 B2 | 8/2015 | Dimou et al. |
| 9,596,615 B1 | 3/2017 | Sun et al. |
| 10,374,298 B2 | 8/2019 | Be et al. |
| 2007/0120759 A1 | 5/2007 | Hawes |
| 2009/0160700 A1* | 6/2009 | Messer-Yaron ......... G01W 1/10 342/26 R |
| 2009/0298530 A1 | 12/2009 | Armstrong |
| 2010/0150067 A1 | 6/2010 | Penisoara et al. |
| 2010/0321034 A1 | 12/2010 | Hargreaves |
| 2011/0136497 A1 | 6/2011 | Youtz et al. |
| 2014/0139395 A1 | 5/2014 | Solondz |
| 2015/0145717 A1 | 5/2015 | Lim |
| 2016/0119018 A1 | 4/2016 | Lindgren et al. |
| 2016/0173227 A1* | 6/2016 | Kikuma ................. H01Q 1/005 455/63.4 |
| 2016/0285654 A1 | 9/2016 | Gavert et al. |
| 2017/0280389 A1 | 9/2017 | Guilhaumon et al. |
| 2018/0048060 A1 | 2/2018 | Be et al. |
| 2018/0287830 A1 | 10/2018 | Merlin et al. |
| 2019/0150737 A1 | 5/2019 | Bodurka et al. |
| 2019/0182881 A1 | 6/2019 | Teyeb et al. |
| 2019/0260496 A1 | 8/2019 | Emmanuel et al. |
| 2019/0360739 A1 | 11/2019 | Brown et al. |
| 2019/0394657 A1* | 12/2019 | Sjödin .................. H04L 1/0027 |

FOREIGN PATENT DOCUMENTS

| | | |
|---|---|---|
| CN | 105379370 A | 3/2016 |
| CN | 105765890 A | 7/2016 |
| CN | 110832924 A | 2/2020 |
| DE | 3447282 A1 | 7/1986 |
| DE | 202016106799 U1 | 12/2016 |
| JP | 2018196137 A | 12/2018 |
| WO | 2015070896 A1 | 5/2015 |
| WO | 2018036608 A1 | 3/2018 |
| WO | 2018075180 A1 | 4/2018 |

OTHER PUBLICATIONS

Kim, M. et al., "Rainfall Detection and Rainfall Rate Estimation Using Microwave Attenuation", Atmosphere, vol. 9 No. 287, Jul. 24, 2018, pp. 1-21, MDPI.

Overeem, A. et al., "Measuring Urban Rainfall Using Microwave Links From Commercial Cellular Communication Networks", Water Resources Research, vol. 27 No. W12505, Dec. 6, 2011, pp. 1-16, American Geophysical Union.

Lopez-Roldan, J. et al., "Development of a Pocket Ultrahigh Frequency Partial-Discharge Detector to Warn Switchyard Personnel of Imminent Failure of a Nearby High-Voltage Plant", IEEE Electrical Insulation Magazine, vol. 28 No. 1, Jan. 1, 2012, pp. 6-11, IEEE.

* cited by examiner

PRECIPITATION MONITORING USING POINT TO POINT RADIO LINKS

TECHNICAL FIELD

The present disclosure relates to precipitation monitoring using point to point radio communication links.

BACKGROUND

Microwave links can be used for local weather monitoring, such as precipitation level, by considering the received power of microwave signals. By comparing the received signal power with a reference power level, for example a power level that corresponds to absence of precipitation, one can estimate the rate of precipitation. With a sufficiently high density of microwave links, precipitation levels can be estimated with higher time and space resolution than weather radars.

Precipitation is not the only phenomena causing attenuation of microwave signals. There are many other impairments that affect the received power level, resulting in inaccurate estimated precipitation levels. Examples of such impairments are selective fading, objects obstructing the signal path and wind.

It is therefore desired to provide a more accurate weather monitoring system.

SUMMARY

The object of the present disclosure is to provide more accurate weather monitoring.

This object is obtained by means of a weather monitoring system for monitoring precipitation in a geographical region, the system comprising a weather monitoring unit, a classification unit and at least one point to point radio link deployed in the geographical region. The classification unit is arranged to obtain link data from the at least one point to point radio link, where the link data comprises received signal strength data associated with an operation of the at least one point to point radio link. The classification unit is arranged to determine disturbance event data based on the link data indicating if the received signal strength data is affected by a disturbance event other than a precipitation event. The weather monitoring unit is arranged to obtain the link data from the at least one point to point radio link and to obtain the disturbance event data from the classification unit. The weather monitoring system is further arranged to monitor precipitation in the geographical region based on the link data and on the disturbance event data.

In this manner, true precipitation events can be distinguished from disturbance events due to impairments affecting said point to point radio link. Thus false, or "ghost", precipitation events can be discarded.

In this context, a precipitation event is an event that is associated with any product of the condensation of atmospheric water vapor that falls under gravity, such as for example rain and snow.

According to some aspects, the classification unit is arranged to determine if the link data from a first point to point radio link is affected by a disturbance event based on link data from a plurality of point to point radio links comprising the first point to point radio link.

In this manner, data from several point to point radio links is used, providing more input.

According to some aspects, the classification unit is arranged to determine if the link data from a first point to point radio link is affected by a disturbance event based on link data from a plurality of point to point radio links in a geographical vicinity of the first point to point radio link, where the plurality of point to point radio links comprises the first point to point radio link.

In this manner, data from several locally arranged point to point radio links is used, providing more input data about the situation in the geographical vicinity in question. This also allows for an implementation of reduced complexity and processing power requirements compared to if all point to point radio links are used.

According to some aspects, the classification unit is arranged to determine if the link data from a first point to point radio link is affected by a disturbance event based on link data obtained solely from the first point to point radio link.

This also allows for an implementation of reduced complexity and processing power requirements compared to if more than one point to point radio link is used.

According to some aspects, the weather monitoring unit is arranged to monitor precipitation by comparing the received signal strength data with respective reference signal strength levels of the at least one point to point radio link.

This enables an accurate precipitation monitoring.

According to some aspects, the weather monitoring unit is arranged to estimate rain rate over the geographical region based on the link data and on the disturbance event data.

In this manner, more accurate weather monitoring is provided.

According to some aspects, the weather monitoring unit is arranged to estimate rain rate associated with a first point to point radio link as zero in case the first point to point radio link is associated with a disturbance event other than a precipitation event.

In this manner, disturbance events are discarded when estimating precipitation.

According to some aspects, the link data further comprises any of; an adaptive filter state, a mean-squared error (MSE) value associated with data detection, and a power difference determined before and after channel filtering, associated with the at least one point to point radio link.

In case the adaptive filter is an equalizer filter, the adaptive filter state is indicative of multipath propagation. In case the adaptive filter is a filter for cross-polar interference cancellation, then the adaptive filter state is indicative of a current cross-polar interference situation.

A mean-square error value may be indicative of a combined effect from a plurality of detrimental effects, such as interference and fading. MSE may also be used instead of received signal power, since a low received signal power implies an increased MSE. The power difference determined before and after channel filtering is indicative of co-channel or out-of-band interference.

According to some aspects, the disturbance event data further comprises a type of disturbance event, wherein the type of disturbance event is selected from a set of disturbance types comprising selective fading, obstructed signal path, wet snow, rain and wind.

In this manner, each disturbance event can be recognized and classified.

According to some aspects, the classification unit is arranged to be configured with a latency parameter indicating an allowable time latency associated with determining based on the link data if the received signal strength data is affected by a disturbance event.

According to some aspects, the classification unit is arranged to determine based on the link data if the received signal strength data is affected by a disturbance event based on the link data using a machine learning algorithm.

A machine-learning algorithm can be used to sort new data into the different classes with high accuracy. A machine-learning algorithm can be used to determine the cause of reduced received power of point to point radio links, determining when additional link attenuation is caused by precipitation, and when it is caused by other impairments.

This object is also obtained by means of a classification unit, methods and a computer program product which all provide corresponding advantages.

More specifically, this object is also obtained by means of a classification unit arranged to obtain link data from at least one point to point radio link. The link data comprises received signal strength data associated with an operation of the at least one point to point radio link. The classification unit is arranged to determine disturbance event data based on the link data indicating if the received signal strength data is affected by a disturbance event other than a precipitation event.

Moreover, this object is also obtained by means of a method for monitoring precipitation in a geographical region. The method comprises obtaining link data from at least one point to point radio link, the link data comprising received signal strength data associated with an operation of the at least one point to point radio link. The method further comprises determining disturbance event data based on the link data indicating if the received signal strength data is affected by a disturbance event other than a precipitation event. The method further comprises monitoring precipitation in the geographical region based on the link data and on the disturbance event data.

Moreover, this object is also obtained by means of a method for classifying disturbance events by a classification unit, where the method comprises obtaining link data from at least one point to point radio link. The link data comprises received signal strength data associated with an operation of the at least one point to point radio link. The method further comprises determining disturbance event data based on the link data indicating if the received signal strength data is affected by a disturbance event other than a precipitation event.

Moreover, this object is also obtained by means of a computer program product comprising a computer program according to the methods described above, and a computer readable storage medium on which the computer program is stored.

BRIEF DESCRIPTION OF THE DRAWINGS

The present disclosure will now be described more in detail with reference to the appended drawings, where.

DETAILED DESCRIPTION

Aspects of the present disclosure will now be described more fully with reference to the accompanying drawings. The different devices, computer programs and methods disclosed herein can, however, be realized in many different forms and should not be construed as being limited to the aspects set forth herein. Like numbers in the drawings refer to like elements throughout.

The terminology used herein is for describing aspects of the disclosure only and is not intended to limit the invention. As used herein, the singular forms "a", "an" and "the" are intended to include the plural forms as well, unless the context clearly indicates otherwise.

Figure 1:
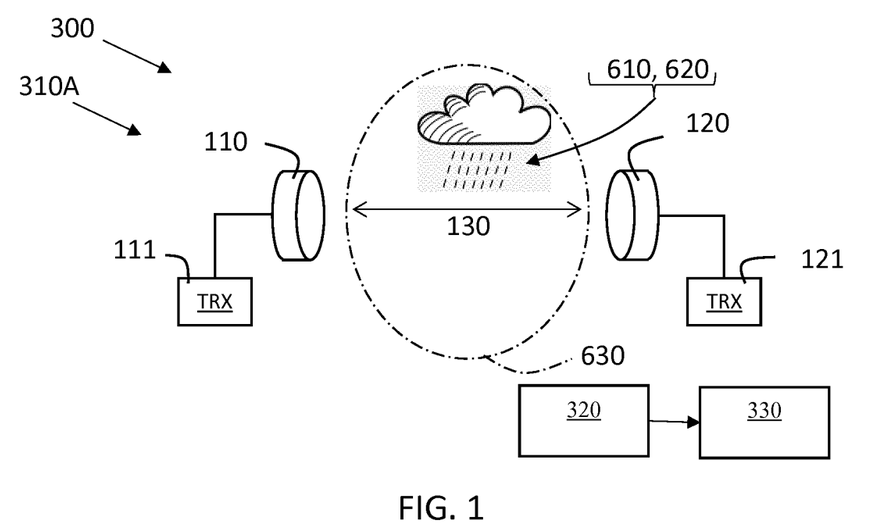
FIGS. 1-2 show schematic views of point to point radio communication links.

With reference to FIG. 1, there is a first point to point radio link 310A that is comprised in a weather monitoring system 300 for monitoring precipitation 610, 620. The point to point radio link 310A comprises a first antenna 110, a first transceiver unit 111, a second antenna 120 and a second transceiver unit 121, where communication is intended to take place in a communication channel 130. The weather monitoring system 300 comprises a weather monitoring unit 330 and a classification unit 320.

The weather is monitored by comparing at least received signal power with a reference power level at one of the transceiver units 111, 121, where the result is indicative of a possible level of precipitation 610, 620. Such a reference power level can for example be a power level that corresponds to absence of precipitation or correspond to transmitted signal power such that link attenuation can be established.

The power level may be measured in Watts, dBm, or the like. The power level may be measured in absolute terms or relative to some reference power level, in which case the power level can be measured in dB. It is appreciated that a power level may be measured in a frequency band using known techniques which will not be discussed in detail herein. It is appreciated that power level can also be measured or indicated implicitly, for instance via a mean-squared error value. Thus, received signal power should be interpreted broadly to encompass any measurement or indication from which received signal power can be at least partly inferred.

Figure 2:
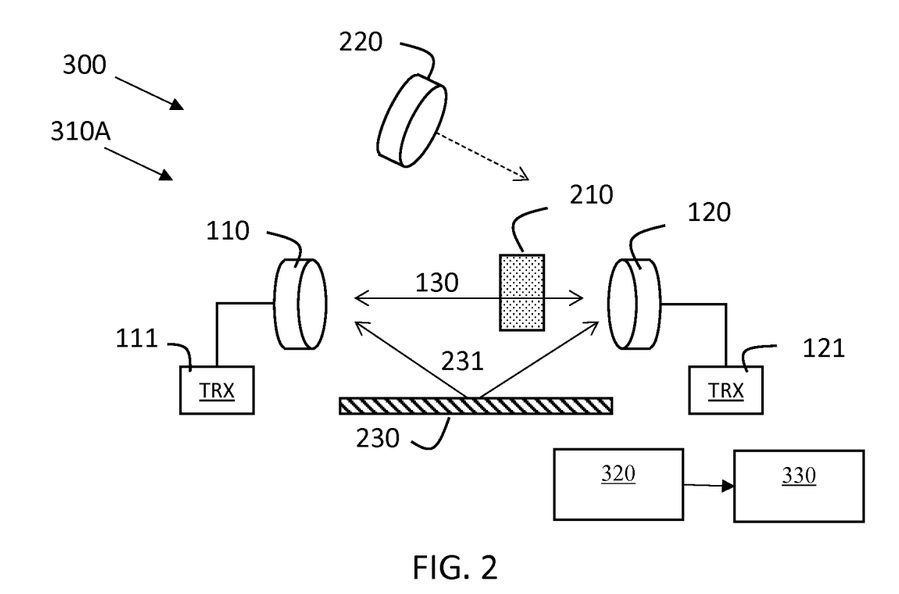

As indicated in FIG. 2, corresponding to FIG. 1, precipitation 610, 620 could be erroneously indicated due to a disturbance event other than a precipitation event, such as interfering signals sources 220, objects 210 in the signal path and signal multipath due to reflections 231 in objects 230.

In this context, a precipitation event is an event that is associated with any product of the condensation of atmospheric water vapor that falls under gravity, such as for example rain and snow.

Figure 3:
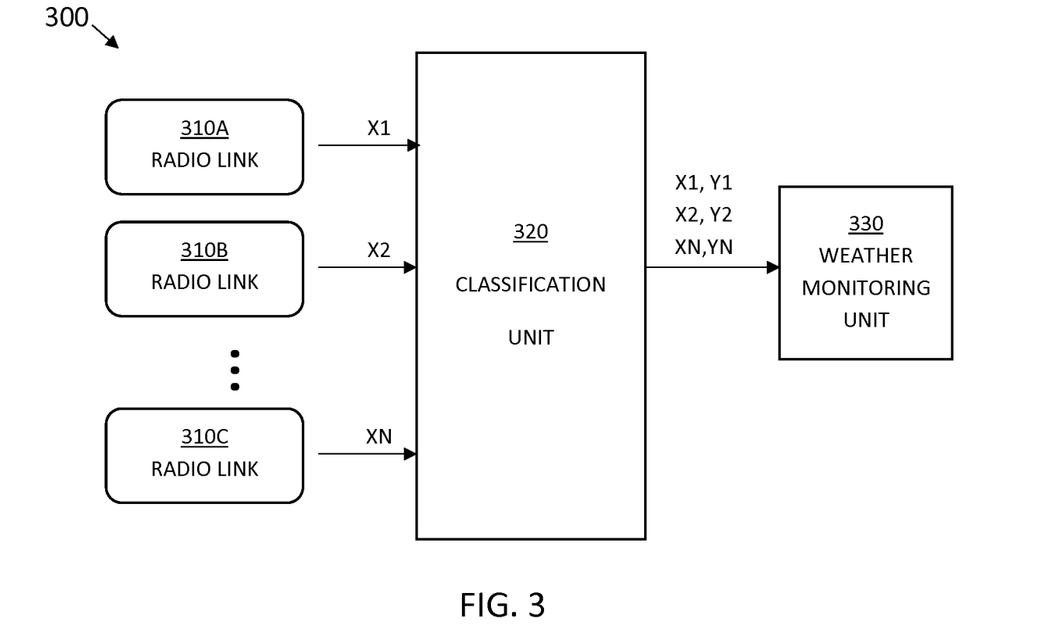
FIGS. 3-5 illustrate example weather monitoring systems.

Also with reference to FIG. 3, where a plurality of point to point radio links 310A, 3108, 310C are shown, the classification unit 320 is arranged to obtain link data X1, X2, XN from at least one of the point to point radio links 310A, 310B, 310C. The link data comprises received signal strength data that is associated with an operation of the point to point radio links 310A, 310B, 310C.

According to some aspects, received signal strength data relates to measured received signal power relative a certain reference power level, for example compared with a reference power level as described above. According to some further aspects, received signal strength data comprises information regarding link attenuation and also indirect measures such as bit errors, package errors etc.

According to some aspects, received signal strength data that is associated with an operation of the point to point radio links 310A, 310B, 310C relates to at least one of information acquired during ordinary data traffic, information acquired via a designated control channel in the communication band, information acquired via a periodically transmitted pilot sequence, information acquired via a signal that is transmitted on demand and information acquired via a specific measurement signal that is transmitted in a band that is separated from the communication band. The above are only examples, the received signal strength data can be associated with an operation of the point to point radio links 310A, 310B, 310C in many other ways.

According to the present disclosure, the classification unit 320 is arranged to determine disturbance event data Y1, Y2, YN based on the link data indicating if the received signal strength data is affected by a disturbance event other than a precipitation event.

Figure 6:
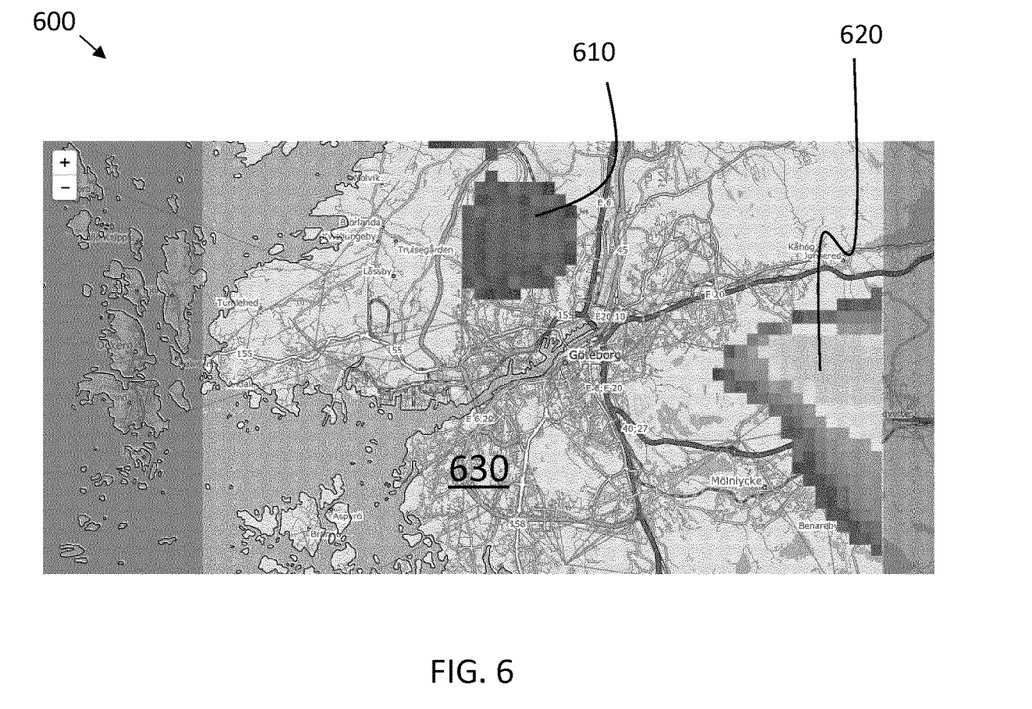
FIG. 6 schematically illustrates the result of precipitation monitoring in a geographical region.

The weather monitoring unit 330 is arranged to obtain the link data X1, X2, XN from at least one of the point to point radio links 310A, 3108, 310C and to obtain the disturbance event data Y1, Y2, YN from the classification unit 320, and to monitor precipitation in a geographical region 630 as shown in FIG. 6, that schematically illustrates the result of precipitation monitoring in a geographical region 630 by means of a weather map 600. The precipitation 610, 620 is monitored based on the link data X1, X2, XN and on the disturbance event data Y1, Y2, YN. It is appreciated that the link data X1, X2, XN according to some aspects can be obtained by the weather monitoring system via the classification unit 320 instead from the point to point radio links 310A, 310B, 310C directly. In this case, the link data may be re-formatted by the classification unit. It is also appreciated that the classification unit and the weather monitoring unit may be implemented as a single module or in separate modules.

According to some aspects, the weather monitoring unit 330 is arranged to estimate precipitation rate, such as rain rate, over the geographical region 630 based on the link data X1, X2, XN and on the disturbance event data Y1, Y2, YN.

The classification unit 320, i.e. the classifier, is adapted to choose between a normal mode and a set of disturbances, one of which is precipitation. According to some aspects, the disturbance event data Y1, Y2, YN comprises a type of disturbance event, wherein the classifier 320 is adapted to select a type of disturbance event from a set of disturbance types comprising, e.g., selective fading, obstructed signal path, wet snow, rain and wind. In the absence of disturbance, the normal mode is selected.

The link data X1, X2, XN may be constituted by time series vectors from the point to point radio links 310A, 3108, 310C in a given time window and possibly together with metadata to form a feature vector which is processed by the classifier 320 to determine the channel conditions/impairments that affect the link.

If the output from the classifier 320 indicates that a rain disturbance has not occurred, then the rain intensity is assumed to be zero even if the received power of the point to point radio links 310A, 310B, 310C is below the reference power level.

The classifier 320 provides as its outputs measures for certain phenomena it has learned to recognize, and these measures can be used to determine whether rain is present or not. For instance, these measures can form probabilities and a threshold can be set for rain probability, and if a certain probability falls below this threshold it is assumed that there is no rain. In this case, the disturbance event data Y1, Y2, YN can be set to 1 if rain is determined to be present, or 0 if rain is not determined to be present. In other words, according to some aspects, the weather monitoring unit 330 is arranged to estimate rain rate associated with a first point to point radio link 310A as zero in case the first point to point radio link is associated with a disturbance event other than a precipitation event.

If the rain probability is of a similar magnitude as the probabilities of one or more of the other types of disturbance events handled by the classifier, then it can be assumed that the link attenuation due to these disturbance events are caused in proportion to their probabilities, i.e., if the probabilities for rain and multipath propagation are 50% each, then 50% of the additional attenuation with respect to the expected level can be assumed to be caused by rain.

The link data X1, X2, XN can be, e.g., sampled values of the received power or link attenuation during the time window, and may also include performance indicators such as mean-square-error, error vector magnitude, equalizer tap values, and measures of interference from other point to point radio links, which can be extracted from the modem used for baseband processing.

According to some aspects, the classifier 320 comprises a machine learning model that has been trained beforehand using known data which represent the classes of channel conditions/impairments the classifier should learn to recognize. After the training has been completed, the classifier 320 can partition the feature vector space into one region per channel condition/impairment, possibly there can be an overlap between the regions belonging to different classes. There is one output node per class, representing the probability that a feature vector belongs to that class. When a new feature vector is classified one assumes it belongs to the class whose output node has the largest value, i.e., highest probability.

The classifier 320 is thus used to identify true rain events where different channel conditions typically result in distinctly different patterns for the link data X1, X2, XN. It is possible to teach a machine-learning model to perform a mapping from an input vector space, the space of the time series data in the form of the link data X1, X2, XN, to output probabilities for a set of pre-defined classes of channel conditions/disturbances, which include rain, normal operation, multipath propagation, and signal obstruction from objects such as for example cranes at construction sites. The machine-learning model can be regarded as a filter where known data is presented to an iterative training algorithm which adapts the tap weights until convergence is achieved. At this point, it should be possible to use the machine-learning model to sort new data into the different classes with high accuracy, provided that the dataset used for training has provided a representative view of each class.

Machine learning models and/or signal processing are thus according to some aspects used to determine the cause of reduced received power of point to point radio links, determining when additional link attenuation is caused by rain, and when it is caused by other impairments.

The length of the time window used by the classifier can be configured based on a tradeoff between acceptable latency and the accuracy of the classification of the machine learning model. According to some aspects, latency can be set by the user, i.e., the weather map can be displayed with minimum latency, implying no correction for ghost rain events, or with longer latency, which allows for identifying such events with machine learning in dependence of a user's choice.

The classification unit 320 is thus according to some aspects arranged to be configured with a latency parameter indicating an allowable time latency associated with determining if the received signal strength data is affected by a disturbance event based on the link data.

By sorting out the true precipitation events such as rain events from the other types of disturbance events affecting point to point radio links, false, or "ghost", precipitation events can be discarded.

According to some aspects, the classification unit 320 is arranged to determine if the link data X1 from a first point to point radio link 310A is affected by a disturbance event based on link data X1, X2, XN from a plurality of point to point radio links 310A, 310B, 310C.

Figure 4:
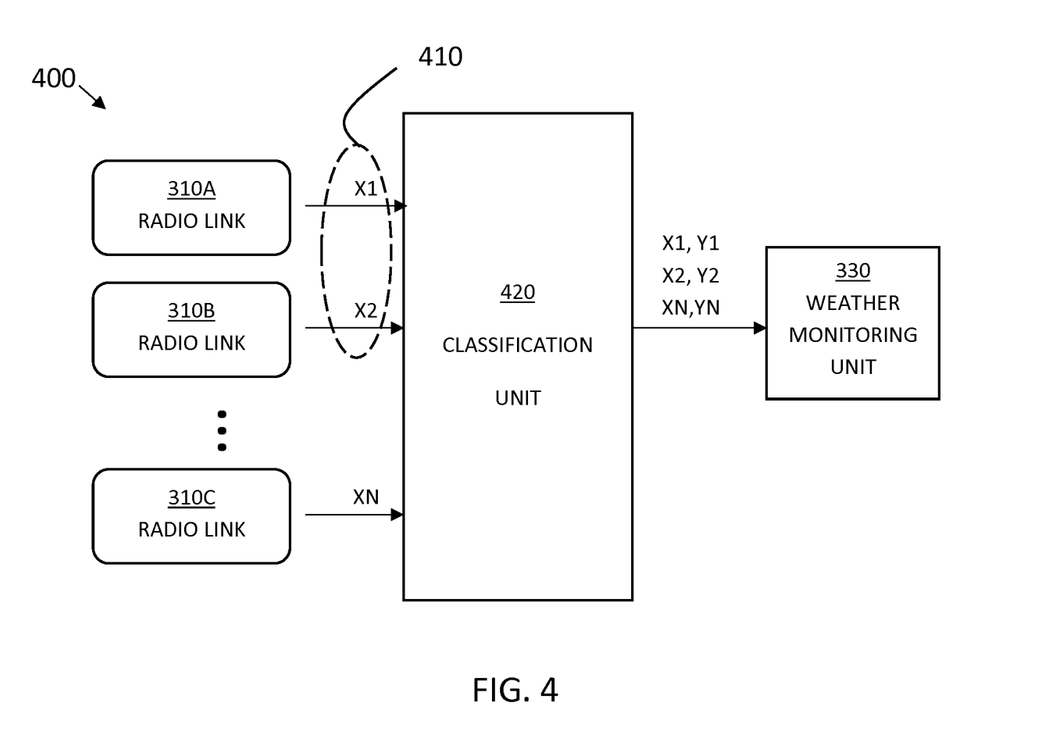

According to some aspects, as shown in FIG. 4, there is a weather monitoring system 400 where the classification unit 420 is arranged to determine if the link data X1 from a first point to point radio link 310A is affected by a disturbance event based on link data X1, X2 from a plurality of point to point radio links 310A, 310B, where the plurality of point to point radio links 310A, 310B are located in a geographical vicinity 410 of the first point to point radio link 310A.

Consequently, for example, the first point to point radio link 310A and a second point to point radio link 310B may be located in a geographical vicinity 410 of each other, while a third point to point radio link 310C may be located further away. The classification unit 420 then only uses the data from the two point to point radio links 310A, 310B located in a geographical vicinity 410 of each other. This may allow for an implementation of reduced complexity and processing power requirements compared to if all point to point radio links are used. According to some aspects, a geographical vicinity means a certain area within which the distance to adjacent point to point radio links falls below a certain threshold.

Figure 5:
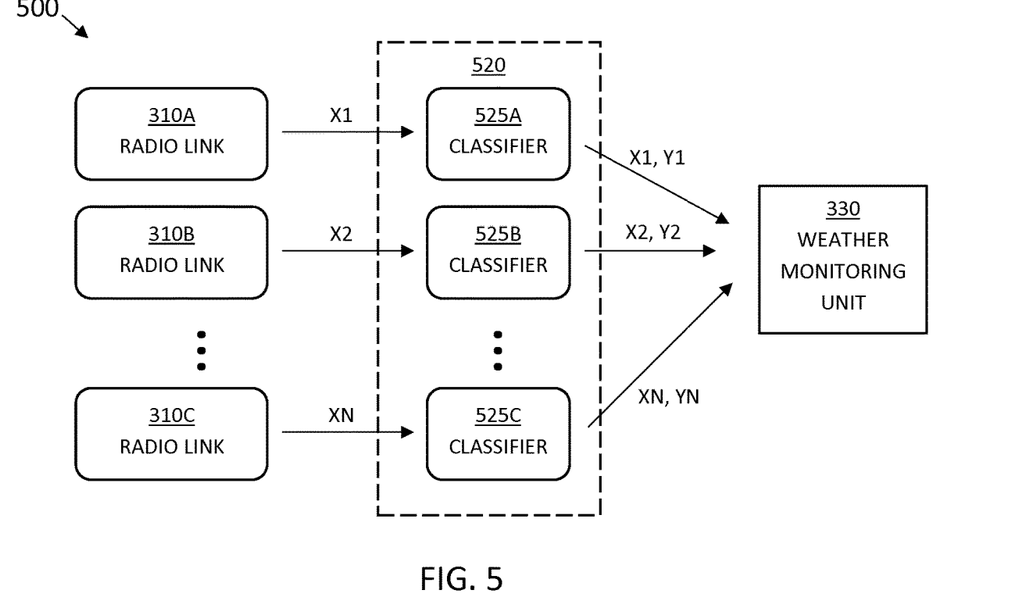

According to some aspects, as shown in FIG. 5, there is a weather monitoring system 500 where the classification unit 520 is arranged to determine if the link data X1 from a certain point to point radio link 310A is affected by a disturbance event based on link data obtained solely from this point to point radio link 310A. For this purpose, the classification unit 520 comprises one corresponding classifier 525A, 525B, 525C for each point to point radio link 310A, 310B, 310C.

According to some aspects, the link data X1, X2, XN comprises any of; an adaptive filter state, a mean-squared error (MSE) value associated with data detection, and a power difference determined before and after channel filtering, associated with the at least one point to point radio link 310A, 310B, 310C.

It is appreciated that the adaptive filter may be an equalizer filter, in which case the adaptive filter state is indicative of multipath propagation. In case the adaptive filter is a filter for cross-polar interference cancellation, then the adaptive filter state is indicative of a current cross-polar interference situation.

A mean-square error value may be indicative of a combined effect from a plurality of detrimental effects, such as interference and fading. MSE may also be used instead of received signal power, since a low received signal power implies an increased MSE. The power difference determined before and after channel filtering is indicative of co-channel or out-of-band interference.

Figure 7:
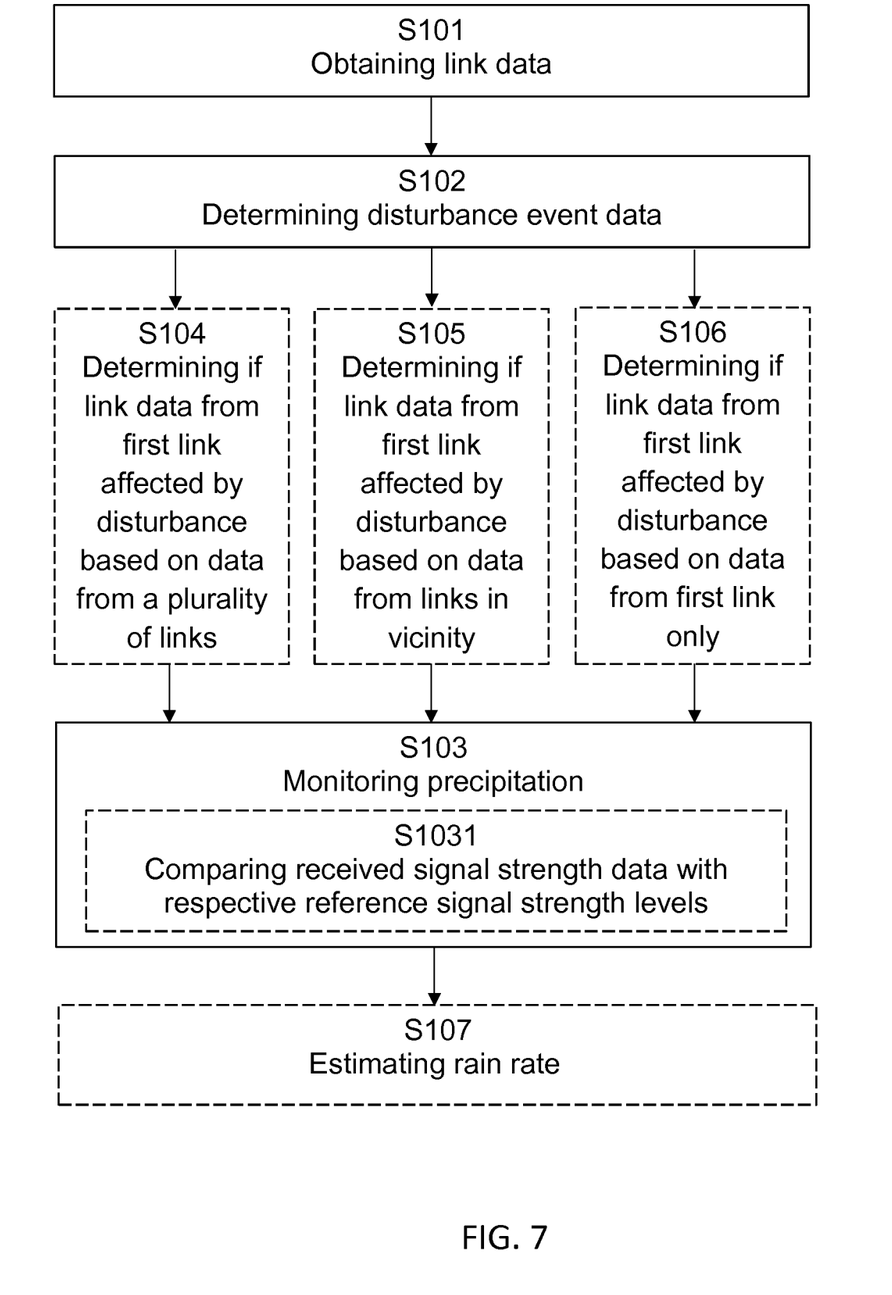
FIG. 7-8 are flowcharts illustrating methods.

With reference to FIG. 7, the present disclosure relates to a method for monitoring precipitation 610, 620 in a geographical region 630. The method comprises obtaining S101 link data X1, X2, XN from at least one point to point radio link. The link data X1, X2, XN comprises received signal strength data associated with an operation of the at least one point to point radio link 310A, 310B, 310C. The method further comprises determining S102 disturbance event data Y1, Y2, YN based on the link data indicating if the received signal strength data is affected by a disturbance event other than a precipitation event. The method further comprises monitoring S103 precipitation in the geographical region 630 based on the link data X1, X2, XN and on the disturbance event data Y1, Y2, Y3.

According to some aspects, the method comprises determining S104 if the link data X1 from a first point to point radio link 310A is affected by a disturbance event based on link data X1, X2, XN from a plurality of point to point radio links 310A, 310B, 310C comprising the first point to point radio link 310A.

According to some aspects, the method comprises determining S105 if the link data X1 from a first point to point radio link 310A is affected by a disturbance event based on link data X1, X2 from a plurality of point to point radio links 310A, 310B in a geographical vicinity of the first point to point radio link 310A, where the plurality of point to point radio links comprises the first point to point radio link 310A.

According to some aspects, the method comprises determining S106 if the link data X1 from a first point to point radio link 310A is affected by a disturbance event based on link data obtained solely from the first point to point radio link 310A.

According to some aspects, the method comprises monitoring S103 precipitation by comparing S1031 the received signal strength data with respective reference signal strength levels of the at least one point to point radio link 310A, 310B, 310C.

According to some aspects, the method comprises estimating S107 rain rate over the geographical region 630 based on the link data X1, X2, XN and on the disturbance event data Y1, Y2, YN.

According to some aspects, the method comprises estimating rain rate associated with a first point to point radio link 310A as zero in case the first point to point radio link is associated with a disturbance event other than a precipitation event.

According to some aspects, the link data X1, X2, XN further comprises any of; an adaptive filter state, a mean-squared error, MSE, value associated with data detection, and a power difference determined before and after channel filtering, associated with the at least one point to point radio link 310A, 310B, 310C.

According to some aspects, the disturbance event data further comprises a type of disturbance event, wherein the type of disturbance event is selected from a set of disturbance types comprising selective fading, obstructed signal path, wet snow, rain and wind.

According to some aspects, the method comprises determining based on the link data if the received signal strength data is affected by a disturbance event Y1, Y2, YN using a machine learning algorithm.

Thus, there is provided herein method for monitoring precipitation 610, 620 in a geographical region 630. Thereby, the corresponding advantages and benefits are obtained for the method as for the weather monitoring system as such.

Figure 8:
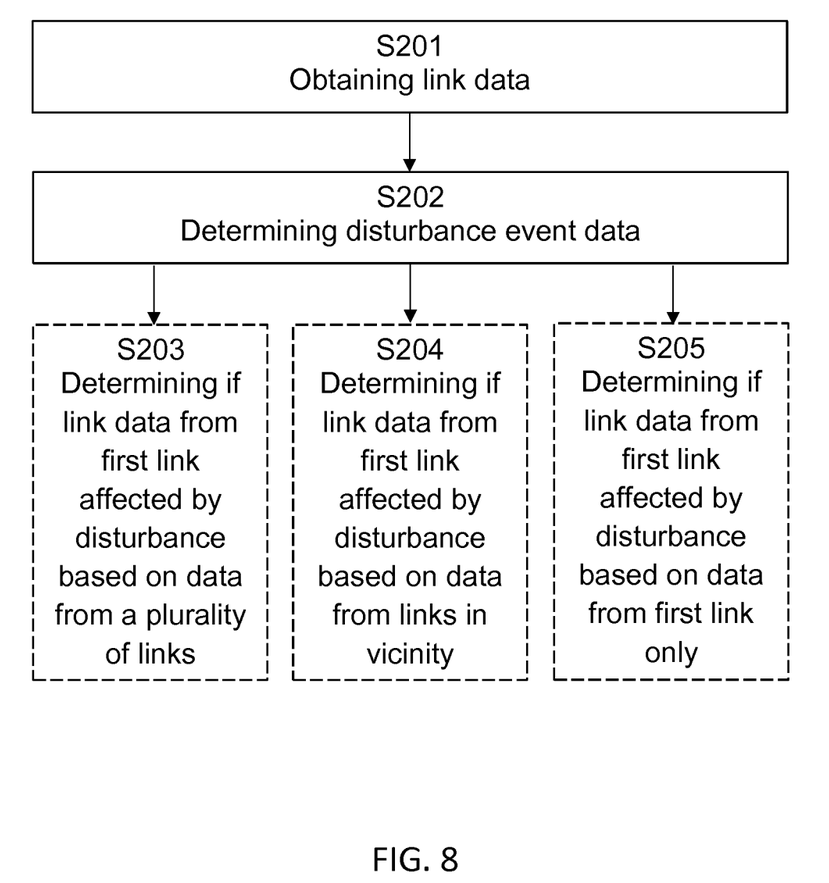

With reference to FIG. 8, the present disclosure also relates to a method for classifying disturbance events by a classification unit 320, 420, 520. The method comprises obtaining 201 link data X1, X2, XN from at least one point to point radio link 310A, 310B, 310C. The link data comprises received signal strength data associated with an operation of the at least one point to point radio link 310A, 310B, 310C. The method further comprises determining 202 disturbance event data Y1, Y2, YN based on the link data indicating if the received signal strength data is affected by a disturbance event other than a precipitation event.

According to some aspects, the method comprises determining 203 if the link data X1 from a first point to point radio link 310A is affected by a disturbance event Y1 based on link data X1, X2, XN from a plurality of point to point radio links 310A, 310B, 310C comprising the first point to point radio link 310A.

According to some aspects, the method comprises determining 204 if the link data X1 from a first point to point radio link 310A is affected by a disturbance event Y1 based on link data X1, X2 from a plurality of point to point radio links 310A, 310B in a geographical vicinity of the first point to point radio link 310A, where the plurality of point to point radio links comprises the first point to point radio link.

According to some aspects, the method comprises determining 205 if the link data X1 from a first point to point radio link 310A is affected by a disturbance event Y1 based on link data obtained solely from the first point to point radio link 310A.

According to some aspects, the link data X1, X2, XN further comprises any of; an adaptive filter state, a mean-squared error, MSE, value associated with data detection, and a power difference determined before and after channel filtering, associated with the at least one point to point radio link 310A, 310B, 310C.

According to some aspects, the disturbance event data further comprises a type of disturbance event, wherein the type of disturbance event is selected from a set of disturbance types comprising selective fading, obstructed signal path, wet snow, rain and wind.

According to some aspects, the method comprises determining based on the link data if the received signal strength data is affected by a disturbance event Y1, Y2, YN using a machine learning algorithm.

Thus, there is provided herein method for classifying disturbance events by a classification unit 320, 420, 520. Thereby, the corresponding advantages and benefits are obtained for the method as for the classification unit as such.

Figure 9:
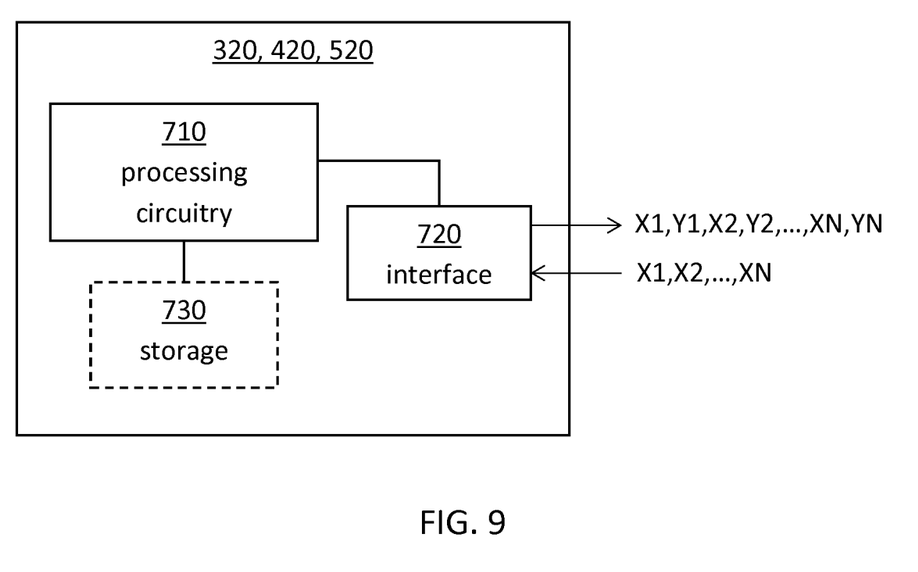
FIG. 9 schematically illustrates a classification unit.

FIG. 9 schematically illustrates a classification unit 320, 420, 520 according to aspects of the present disclosure. It is appreciated that the above described methods and techniques may be realized in hardware. This hardware is then arranged to perform the methods, whereby the same advantages and effects are obtained as have been discussed above.

Processing circuitry 710 is provided using any combination of one or more of a suitable central processing unit (CPU), multiprocessor, microcontroller, digital signal processor (DSP), etc., capable of executing software instructions stored in a computer program product, e.g. in the form of a storage medium 730. The processing circuitry 710 may further be provided as at least one application specific integrated circuit (ASIC), or field programmable gate array (FPGA).

Particularly, the processing circuitry 710 is configured to cause the classification unit to perform a set of operations, or steps. For example, the storage medium 730 may store the set of operations, and the processing circuitry 710 may be configured to retrieve the set of operations from the storage medium 730 to cause the classification unit to perform the set of operations. The set of operations may be provided as a set of executable instructions. Thus, the processing circuitry 710 is thereby arranged to execute methods as herein disclosed.

The storage medium 730 may also comprise persistent storage, which, for example, can be any single one or combination of magnetic memory, optical memory, solid state memory or even remotely mounted memory.

The classification unit may further comprise a communications interface 720 for communications with at least one external device. As such the communication interface 720 may comprise one or more transmitters and receivers, comprising analogue and digital components and a suitable number ports for wireline or wireless communication.

The processing circuitry 710 controls the general operation of the unit, e.g. by sending data and control signals to the communication interface 720 and the storage medium 730, by receiving data and reports from the communication interface 720, and by retrieving data and instructions from the storage medium 730. Other components, as well as the related functionality, of the unit are omitted in order not to obscure the concepts presented herein.

Figure 10:
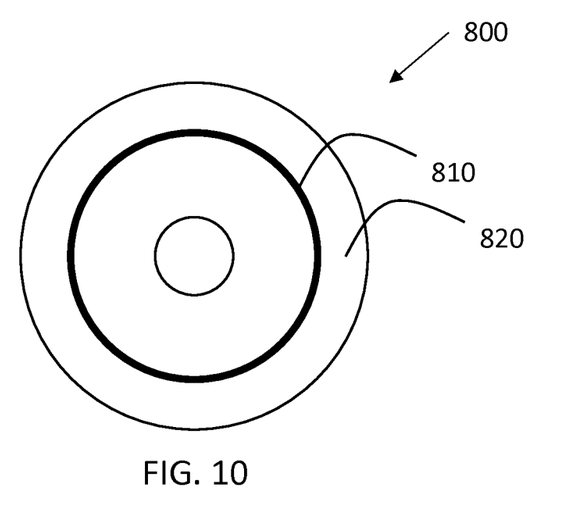
FIG. 10 schematically illustrates a computer program product.

FIG. 10 schematically illustrates a computer program product 800 comprising a computer program 810 according to the disclosure above, and a computer readable storage medium 820 on which the computer program is stored.

The present disclosure is not limited to the above, but may vary freely within the scope of the appended claims. For example, the precipitation is not limited to rain, but can be any form of precipitation. Generally, precipitation relates to any product of condensation of atmospheric water vapor that falls under gravity, such as for example rain and snow.

Furthermore, each one of the point to point radio links can be any form of point to point radio links such as for example microwave links.

According to some aspects, a point to point radio link may be comprised in a point to point radio link network that in turn can comprise more than one point to point radio link, and thus more than two point to point radio link transceivers.

The present disclosure generally relates to a weather monitoring system 300, 400, 500 for monitoring precipitation 610, 620 in a geographical region 630, the system comprising a weather monitoring unit 330, a classification unit 320, 420, 520 and at least one point to point radio link 310A, 310B, 310C deployed in the geographical region 630, the classification unit 320, 420, 520 being arranged to obtain link data X1, X2, XN from the at least one point to point radio link, the link data comprising received signal strength data associated with an operation of the at least one point to point radio link 310A, 310B, 310C, the classification unit 320, 420, 520 being arranged to determine disturbance event data Y1, Y2, YN based on the link data indicating if the received signal strength data is affected by a disturbance event other than a precipitation event, the weather monitoring unit 330 being arranged to obtain the link data X1, X2, XN from the at least one point to point radio link 310A, 310B, 310C and to obtain the disturbance event data Y1, Y2, YN from the classification unit 320, 420, 520, and to monitor precipitation in the geographical region 630 based on the link data X1, X2, XN and on the disturbance event data Y1, Y2, Y3.

According to some aspects, the classification unit 320 is arranged to determine if the link data X1 from a first point to point radio link 310A is affected by a disturbance event based on link data X1, X2, XN from a plurality of point to point radio links 310A, 310B, 310C comprising the first point to point radio link 310A.

According to some aspects, the classification unit 420 is arranged to determine if the link data X1 from a first point to point radio link 310A is affected by a disturbance event based on link data X1, X2 from a plurality of point to point radio links 310A, 310B in a geographical vicinity of the first point to point radio link 310A, where the plurality of point to point radio links comprises the first point to point radio link 310A.

According to some aspects, the classification unit 520 is arranged to determine if the link data X1 from a first point to point radio link 310A is affected by a disturbance event based on link data obtained solely from the first radio link 310A.

According to some aspects, the at least one point to point radio link 310A, 310B, 310C comprises a microwave point to point radio link.

According to some aspects, the weather monitoring unit 330 is arranged to monitor precipitation by comparing the received signal strength data with respective reference signal strength levels of the at least one point to point radio link 310A, 310B, 310C.

According to some aspects, the weather monitoring unit 330 is arranged to estimate rain rate over the geographical region 630 based on the link data X1, X2, XN and on the disturbance event data Y1, Y2, YN.

According to some aspects, the weather monitoring unit 330 is arranged to estimate rain rate associated with a first point to point radio link 310A as zero in case the first point to point radio link is associated with a disturbance event other than a precipitation event.

According to some aspects, the link data X1, X2, XN further comprises any of; an adaptive filter state, a mean-squared error (MSE) value associated with data detection, and a power difference determined before and after channel filtering, associated with the at least one point to point radio link 310A, 3108, 310C.

According to some aspects, the disturbance event data further comprises a type of disturbance event, wherein the type of disturbance event is selected from a set of disturbance types comprising selective fading, obstructed signal path, wet snow, rain and wind.

According to some aspects, the classification unit 320, 420, 520 is arranged to be configured with a latency parameter indicating an allowable time latency associated with determining based on the link data if the received signal strength data is affected by a disturbance event.

According to some aspects, the classification unit 320, 420, 520 is arranged to determine based on the link data if the received signal strength data is affected by a disturbance event using a machine learning algorithm.

The present disclosure generally also relates to a classification unit 320, 420, 520 arranged to obtain link data X1, X2, XN from at least one point to point radio link 310A, 310B, 310C, the link data comprising received signal strength data associated with an operation of the at least one point to point radio link 310A, 310B, 310C, the classification unit 320, 420, 520 being arranged to determine disturbance event data Y1, Y2, YN based on the link data indicating if the received signal strength data is affected by a disturbance event other than a precipitation event.

According to some aspects, the classification unit 320 is arranged to determine if the link data X1 from a first point to point radio link 310A is affected by a disturbance event based on link data X1, X2, XN from a plurality of point to point radio links 310A, 310B, 310C comprising the first point to point radio link 310A.

According to some aspects, the classification unit 420 is arranged to determine if the link data X1 from a first point to point radio link 310A is affected by a disturbance event based on link data X1, X2 from a plurality of point to point radio links 310A, 310B in a geographical vicinity of the first point to point radio link 310A, where the plurality of point to point radio links comprises the first point to point radio link 310A.

According to some aspects, the classification unit 520 is arranged to determine if the link data X1 from a first point to point radio link 310A is affected by a disturbance event based on link data obtained solely from the first point to point radio link 310A.

According to some aspects, the link data X1, X2, XN further comprises any of; an adaptive filter state, a mean-squared error (MSE) value associated with data detection, and a power difference determined before and after channel filtering, associated with the at least one point to point radio link 310A, 3108, 310C.

According to some aspects, the disturbance event data further comprises a type of disturbance event, wherein the type of disturbance event is selected from a set of disturbance types comprising selective fading, obstructed signal path, wet snow, rain and wind.

According to some aspects, the classification unit 320, 420, 520 is arranged to be configured with a latency parameter indicating an allowable time latency associated with determining based on the link data if the received signal strength data is affected by a disturbance event.

According to some aspects, the classification unit 320, 420, 520 is arranged to determine based on the link data if the received signal strength data is affected by a disturbance event Y1, Y2, YN using a machine learning algorithm.

The present disclosure generally also relates to a computer program product 800 comprising a computer program 810 according to the methods above, and a computer readable storage medium 820 on which the computer program is stored.

The present disclosure generally also relates to methods as described above.

The invention claimed is:

1. A method for monitoring precipitation in a geographical region, the method comprising:
    obtaining link data from at least one point to point radio link, the link data comprising received signal strength data associated with an operation of the at least one point to point radio link;
    determining disturbance event data based on the link data indicating if the received signal strength data is affected by a disturbance event other than a precipitation event;
    determining if the link data from a first point to point radio link is affected by a disturbance event based on link data from a plurality of point to point radio links comprising the first point to point radio link; and
    monitoring precipitation in the geographical region based on the link data and on the disturbance event data.

2. The method of claim 1:
    wherein the plurality of point to point radio links are in a geographical vicinity of the first point to point radio link.

3. The method of claim 1, wherein the method comprises monitoring precipitation by comparing the received signal strength data with respective reference signal strength levels of the at least one point to point radio link.

4. The method of claim 1, wherein the method comprises estimating rain rate over the geographical region based on the link data and on the disturbance event data.

5. The method of claim 4, wherein the estimating comprises estimating the rain rate associated with the first point to point radio link as zero in response to the first point to point radio link being associated with a disturbance event other than a precipitation event.

6. The method of claim 1, wherein the method comprises determining, based on the link data, if the received signal strength data is affected by the disturbance event using a machine learning algorithm.

7. A weather monitoring system for monitoring precipitation in a geographical region, the weather monitoring system comprising
a classification unit;
a weather monitoring unit; and
at least one point to point radio link deployed in the geographical region;
wherein the classification unit is configured to:
obtain link data from the at least one point to point radio link, the link data comprising received signal strength data associated with an operation of the at least one point to point radio link;
determine disturbance event data based on the link data indicating if the received signal strength data is affected by a disturbance event other than a precipitation event; and
determine if the link data from a first point to point radio link is affected by a disturbance event based on link data from a plurality of point to point radio links comprising the first point to point radio link; and
wherein the weather monitoring unit is configured to:
obtain the link data from the at least one point to point radio link;
obtain the disturbance event data from the classification unit; and
monitor precipitation in the geographical region based on the link data and on the disturbance event data.

8. The weather monitoring system of claim 7, wherein the weather monitoring unit is configured to monitor precipitation by comparing the received signal strength data with respective reference signal strength levels of the at least one point to point radio link.

9. The weather monitoring system of claim 7, wherein the classification unit is configured with a latency parameter indicating an allowable time latency associated with determining, based on the link data, if the received signal strength data is affected by the disturbance event.

10. A method for classifying disturbance events by a classification unit, the method comprising:
obtaining link data from at least one point to point radio link, the link data comprising received signal strength data associated with an operation of the at least one point to point radio link;
determining disturbance event data based on the link data indicating if the received signal strength data is affected by a disturbance event other than a precipitation event; and
determining if the link data from a first point to point radio link is affected by a disturbance event based on link data from a plurality of point to point radio links comprising the first point to point radio link.

11. The method of claim 10 wherein the plurality of point to point radio links are in a geographical vicinity of the first point to point radio link.

12. The method of claim 10, wherein the link data further comprises:
an adaptive filter state associated with the at least one point to point radio link;
a mean-squared error value associated with data detection associated with the at least one point to point radio link; and/or
a power difference determined before and after channel filtering associated with the at least one point to point radio link.

13. The method of claim 10:
wherein the disturbance event data comprises a type of disturbance event selected from a set of disturbance types; and
wherein the type of disturbance event comprises one of selective fading, obstructed signal path, wet snow, rain, and wind.

14. The method of claim 10, wherein the method comprises determining, based on the link data, if the received signal strength data is affected by a disturbance event using a machine learning algorithm.

15. A classification unit, comprising:
processing circuitry;
memory containing instructions executable by the processing circuitry whereby the classification unit is operative to:
obtain link data from at least one point to point radio link, the link data comprising received signal strength data associated with an operation of the at least one point to point radio link;
determine disturbance event data based on the link data indicating if the received signal strength data is affected by a disturbance event other than a precipitation event; and
determine if the link data from a first point to point radio link is affected by a disturbance event based on link data from a plurality of point to point radio links comprising the first point to point radio link.

16. The classification unit of claim 15:
wherein the plurality of point to point radio links are in a geographical vicinity of the first point to point radio link.

17. The classification unit of claim 15, wherein the classification unit is configured with a latency parameter indicating an allowable time latency associated with determining, based on the link data, if the received signal strength data is affected by the disturbance event.

18. A non-transitory computer readable recording medium storing a computer program product for monitoring precipitation in a geographical region, the computer program product comprising program instructions which, when run on processing circuitry of a weather monitoring system, causes the weather monitoring system to:
obtain link data from at least one point to point radio link, the link data comprising received signal strength data associated with an operation of the at least one point to point radio link;
determine disturbance event data based on the link data indicating if the received signal strength data is affected by a disturbance event other than a precipitation event;
determine if the link data from a first point to point radio link is affected by a disturbance event based on link data from a plurality of point to point radio links comprising the first point to point radio link; and
monitor precipitation in the geographical region based on the link data and on the disturbance event data.

19. A non-transitory computer readable recording medium storing a computer program product for classifying disturbance events by a classification unit, the computer program product comprising program instructions which, when run on processing circuitry of the classification unit, causes the classification unit to:

obtain link data from at least one point to point radio link, the link data comprising received signal strength data associated with an operation of the at least one point to point radio link;

determine disturbance event data based on the link data indicating if the received signal strength data is affected by a disturbance event other than a precipitation event; and determine if the link data from a first point to point radio link is affected by a disturbance event based on link data from a plurality of point to point radio links comprising the first point to point radio link.

\* \* \* \* \*

UNITED STATES PATENT AND TRADEMARK OFFICE
CERTIFICATE OF CORRECTION

PATENT NO. : 11,808,916 B2
APPLICATION NO. : 17/264983
DATED : November 7, 2023
INVENTOR(S) : Sjödin et al.

It is certified that error appears in the above-identified patent and that said Letters Patent is hereby corrected as shown below:

In the Specification

In Column 3, Line 57, delete "region," and insert -- region; --, therefor.

In Column 4, Line 49, delete "3108," and insert -- 310B, --, therefor.

In Column 5, Line 16, delete "3108," and insert -- 310B, --, therefor.

In Column 5, Line 47, delete "3108," and insert -- 310B, --, therefor.

In Column 8, Line 63, delete "3108," and insert -- 310B, --, therefor.

In Column 11, Line 32, delete "3108," and insert -- 310B, --, therefor.

In Column 12, Line 14, delete "3108," and insert -- 310B, --, therefor.

Signed and Sealed this
Twenty-third Day of January, 2024

Katherine Kelly Vidal
*Director of the United States Patent and Trademark Office*